United States Patent Office 2,992,246
Patented July 11, 1961

2,992,246
VINYL ESTER TREATMENT
Russell K. Frantz, Gillette, N.J., assignor to Air Reduction Company, Incorporated, New York, N.Y., a corporation of New York
No Drawing. Filed Dec. 29, 1958, Ser. No. 783,127
4 Claims. (Cl. 260—410.9)

This invention relates to the treatment of vinyl ester monomers prepared by reacting acetylene with a carboxylic acid in the vapor phase in the presence of a catalyst with a hypochlorite to increase and improve the polymerization activity of the vinyl ester monomers so produced.

The vinyl esters produced according to this invention are very useful compounds for the production of polymers and thermoplastic materials possessing numerous desirable properties. The resulting polymers are useful for a variety of purposes depending to some extent upon the particular vinyl ester polymers such as in the formation of emulsion paints, films, coating compositions, chewing gum bases, molding resins, adhesives, copolymers, and so forth as is well known to those skilled in the art.

Generally the preparation of vinyl ester monomers by reacting acetylene with a carboxylic acid in the vapor phase in the presence of a catalyst produces vinyl ester monomers possessing variable polymerization activity even though the proportions and reaction conditions are maintained as nearly identical as possible. The polymerization activity will depend to some extent upon the particular vinyl ester monomer being prepared. In some instances the majority of the vinyl ester monomer produced possesses acceptable polymerization activity while in other cases very little or substantially none of the vinyl ester monomer produced possesses acceptable polymerization activity. The degree of polymerization activity which will be possessed by a particular vinyl ester monomer is unpredictable. In those cases where the vinyl ester monomer possesses acceptable polymerization activity there is generally some monomer produced during the reaction which does not possess acceptable polymerization activity. This invention includes the treatment of vinyl ester monomers generally to increase their polymerization activity to commercially acceptable standards and to also further improve the polymerization activity of the vinyl ester monomers which possess a sufficient polymerization activity for commercial use.

Various hypochlorites including alkali metal or alkaline earth metal hypochlorites and chlorinated hydantoins can be used to treat the vinyl ester monomers according to this invention such as sodium hypochlorite, calcium hypochlorite, 1,3-dichloro-5,5-dimethyl hydantoin, potassium hypochlorite, and so forth. I have found that calcium hypochlorite and 1,3-dichloro-5,5-dimethyl hydantoin are particularly effective agents for increasing the polymerization activity of the monomers. Calcium hypochlorite and 1,3-dichloro-5,5-dimethyl hydantoin can be advantageously used to treat the vinyl ester monomers having a substantially low or no polymerization activity. Other hypochlorites such as sodium hypochlorite are more useful in increasing the polymerization activity of vinyl ester monomers which already possess a substantially acceptable polymerization activity. 1,3-dichloro-5,5-dimethyl hydantoin is the preferred treating agent since the use of smaller amounts of the hydantoin is required to increase the polymerization activity of the monomer than with the use of the other treating agents disclosed herein, and separation of the hydantoin and water from the vinyl ester monomer can be more easily accomplished.

The vinyl ester monomers can be treated with the hypochlorites according to this invention directly or while dissolved in a suitable hydrocarbon solvent such as pentane, hexane, and heptane. It is also advantageous to treat the vinyl ester monomer with the hypochlorite in the presence of water in order to obtain a significant increase in monomer polymerization activity. The treatment of the vinyl ester monomer with the hypochlorite in the absence of water has not been found to be particularly effective. In some instances it may not be necessary to add water to the monomer since it may be already present in the hydrocarbon solvent, for example. The vinyl ester monomers can be treated by various methods as will be apparent to those skilled in the art. I have found that it is advantageous to simply stir the hypochlorite into the vinyl ester monomer together with a sufficient amount of water and continuing the stirring for a sufficient length of time to sufficiently increase the polymerization activity of the monomer to the desired or acceptable degree.

The proportions of the hypochlorite which can be used according to this invention can be varied considerably depending upon the particular vinyl ester monomer being treated, the polymerization activity of the vinyl ester monomer being treated, the particular hypochlorite being used to treat the vinyl ester monomer, and so forth. Generally a sufficient amount of hypochlorite should be used to increase the polymerization activity to the desired extent.

As an example, I have found that the optimum conditions for treating crude vinyl pelargonate with calcium hypochlorite is to contact the crude vinyl pelargonate with between 6 to 8 grams of granular calcium hypochlorite for every 200 grams of crude vinyl pelargonate together with 50 to 100 grams of water. Under these conditions the polymerization activity of the crude vinyl pelargonate is increased to within acceptable standards after the treatment has been continued from 2 to 3 hours with stirring at a temperature between 50 to 60° C. Under the same or a similar set of conditions, dichlorodimethyl hydantoin is just as effective as the calcium hypochlorite in about ½ the concentration, that is 3 to 4 grams. The dichlorodimethyl hydantoin requires about the same time of exposure and temperature as the calcium hypochlorite.

I have found that about 4 grams of dichloridimethyl hydantoin for every 200 grams of vinyl ester monomer is generally advantageous with most vinyl ester monomers. The optimum concentrations of other hypochlorites with other vinyl ester monomers can be readily determined by routine experimentation by those skilled in the art.

When treating vinyl laurate to increase its polymerization activity approximately the same amounts of dichlorodimethyl hydantoin can be used to obtain sufficient polymerization activity. The use of calcium hypochlorite to treat vinyl laurate is not as advantageous as dichlorodimethyl hydantoin since calcium hypochlorite tends to form a sticky, stable emulsion which is difficult to break, resulting in purification difficulties and loss of some of the vinyl laurate monomer.

The amount of water used in conjunction with the hypochlorite treatment of the vinyl ester monomers is not critical nor is the temperature. The treamtent can be advantageously carried out at 50° C. although both higher and lower temperatures could be used if desired as will be apparent to those skilled in the art. Similarly, the amount of water which can be used can be varied quite widely and can also be determined quite readily by those skilled in the art by routine experimentation.

When using calcium hypochlorite the granular form is much superior to the powdered form. The powdered form tends to form a stable emulsion which is very difficult to break, making subsequent filtration and removal thereof difficult.

After the vinyl ester monomer has been treated with the hypochlorite and water and maintained under agitation for a sufficient length of time, the mixture generally separates into a water phase and an organic phase. In such a case the water phase can be readily removed by decantation or other means as will be apparent to those skilled in the art. Any solids resulting from the treatment can be removed by filtration and in some instances the aqueous layer settles out quite readily and can be separated adequately from the ester without a filtration step. If the particular hypochlorite used forms an emulsion and the water phase and organic phase do not readily separate, the emulsion can be broken by known procedures as is known by those skilled in the art.

The vapor phase reaction between the carboxylic acid and acetylene can be carried out by using an apparatus consisting of a suitably heated vaporizer tube for effecting the vaporization of the carboxylic acid being reacted and a suitably heated reactor tube packed with a suitable vapor phase reaction catalyst. The reactants are fed into the vaporizer tube under pressure and fed through the reactor tube which is of a sufficient dimension and contains sufficient catalyst to complete the desired reaction. The resulting reaction product is then fed through a condenser and then to a receiver or hold tanks. Various portions of the vinyl ester monomer so produced can be collected from the condenser and tested for polymerization activity. In this manner the treatment portions of the vinyl ester monomer produced which possess acceptable polymerization activity can be eliminated. However, I have found that it is advantageous to treat the entire vinyl ester monomer production with the hypochlorite since the treatment will not only increase the polymerization activity of the vinyl ester monomer which did not meet the specifications but will also improve the polymerization activity of the vinyl ester monomer which meets the polymerization activity specifications.

The particular test employed to determine the degree of vinyl ester monomer polymerization activity will depend to some extent upon the activity desired, the particular vinyl ester monomer being tested and so forth, but mostly upon the degree of activity which would be commercially acceptable and advantageous to the end user. Generally, the polymerization activity of any vinyl ester monomer can be accurately determined by the increase in refractive index as a result of the polymerization of the monomer under set or standardized polymerization conditions. The increase in the refractive index due to polymerization which will indicate an acceptable polymerization activity level will depend somewhat on the particular monomer being tested.

The polymerization conditions used to determine the vinyl ester monomer polymerization activity according to this invention involved the bulk polymerization of a 5 to 10 gram sample of the vinyl ester monomer in the presence of 0.25 percent benzoyl peroxide at 70° C. for a period of 4 hours. Generally I have found that if the refractive index is increased during the polymerization under the above conditions about 0.0200 and preferably 0.0300 the polymerization activity of the monomer has attained an acceptable level. Obviously the greater the increase in the refractive index during the polymerization the more active the vinyl ester monomer.

Various carboxylic acids can be reacted with acetylene in the vapor phase and treated according to this invention including lauric, oleic, butyric, isobutyric, pelargonic, benzoic, toluic, 2-ethyl 4-methyl pentanoic, propionic, and so forth. Other acids can, of course, be used for the preparation of their corresponding vinyl esters by the well-known vapor phase process and treated according to this invention as will be apparent to those skilled in the art. The preparation of vinyl esters by the vapor phase process containing in excess of about 18 carbon atoms becomes increasingly difficult, and it is thus advantageous to prepare vinyl esters according to this invention containing less than 18 carbon atoms. Vinyl esters containing less than 12 carbon atoms can be very advantageously prepared and treated according to this invention.

As disclosed above, the reaction is advantageously carried out by passing the reactants through a suitably heated reactor tube filled with a suitable catalyst in the vapor phase. The reaction generally takes place at substantially atmospheric pressure and the acetylene is maintained under sufficient pressure to insure its flow through the system. After the carboxylic acid has been vaporized the resulting vapor mixture of acetylene and carboxylic acid then passes directly into the reactor tube containing the catalyst. The vapors react to form the corresponding vinyl ester of the carboxylic acid in the tube. The exhaust gases comprising the vinyl ester, unreacted carboxylic acid, and acetylene are then generally passed through a condenser and the condensed vinyl ester and carboxylic acid separated by fractionation, for example, at reduced pressure to recover the pure vinyl ester monomer. The excess acetylene escaping from the reactor tube can readily be recycled.

The reaction temperature can be varied quite widely and will depend to a great extent upon the particular carboxylic acid being reacted as is well known to those skilled in the art. Reaction temperatures between 175 and 220° C. have been found to be quite satisfactory in most instances, although both higher and lower temperatures can be used.

Various mol ratios of acetylene to carboxylic acid can be used. A molar ratio of acetylene to carboxylic acid of 6:1 is advantageous. When reacting carboxylic acids of higher molecular weight such as pelargonic acid, the acetylene-carboxylic acid ratio can be advantageously increased to between 20:1 to 30:1 depending upon the length of the reactor tube. The most appropriate acetylene-carboxylic acid mol ratios which can be used can be readily determined by those skilled in the art by routine experimentation.

Various reaction catalysts can be used to promote the vapor phase reaction between the acetylene and the carboxylic acid including zinc acetate absorbed on or impregnated in charcoal or alumina. Various other catalysts can be used which are disclosed in prior art as will be understood by those skilled in the art. The use of charcoal as a carrier with zinc acetate is the common catalyst.

*Example 1*

Vinyl laurate was prepared by vaporizing lauric acid in a vaporizer and admixing acetylene therewith. The resulting vapor mixture was then passed into a reactor tube packed with a zinc acetate on charcoal catalyst. The reactor tube had a diameter of 1½ inches and was 2 feet long. The average rate of feed of lauric acid through the vaporizer and the reactor tube was 36.2 grams per hour. The acetylene feed rate was between 280 to 300 liters per hour. The reaction temperature in the reactor tube was maintained between 220 and 230° C. The molar ratio of acetylene to acid was approximately 61:5. The reaction vapor exiting from the reactor tube was condensed and the crude vinyl laurate monomer recovered. The crude vinyl laurate was then purified by flash distillation through a Vigreaux column at 1–2 mm. pressure. The resulting product contained from 10 to 20 percent lauric acid. This crude vinyl laurate was further distilled through a heated packed column and the resulting distillate contained less than 5 percent acid.

The resulting monomer was tested for polymerization activity by polymerizing a 10 gram sample in the presence of 0.25 percent benzoyl peroxide at 70° C. for 4 hours. The monomer showed no polymerization activity.

Another sample of the monomer produced according to this Example was treated with 4 grams of 1,3-dichloro- 5,5-dimethyl hydantoin for every 200 grams of vinyl laurate. The hydantoin was simply mixed with the crude vinyl laurate monomer together with about 50 grams of water and stirred for about 3 hours. After the hydantoin treatment was completed the aqueous layer was separated from the vinyl laurate monomer and a 10 gram sample of the monomer bulk polymerized in the presence of 0.25 percent benzoyl peroxide at 70° C. for 4 hours. The refractive index of the original monomer was 1.4273. The refractive index of the polymerization product was 1.4519, an increase of 0.0246. The resulting treated monomer possessed acceptable polymerization activity.

*Example 2*

Vinyl pelargonate was produced using the same conditions and proportions set forth above for vinyl laurate and the resulting vinyl pelargonate tested for polymerization activity in the same manner as the vinyl laurate was tested in the above example. Before treatment with a hypochlorite the vinyl pelargonate showed no polymerization activity. A portion of the vinyl pelargonate so produced was then treated with 4 grams of 1,3-dichloro-5,5-dimethyl hydantoin together with 50 grams of water at 50 to 60° C. and stirred approximately 3 hours. The aqueous layer and the insolubles were then removed from the vinyl pelargonate monomer. The treated vinyl pelargonate monomer was then tested for polymerization activity by polymerizing a portion by a bulk polymerization technique in the presence of 0.25 percent benzoyl peroxide at 70° C. for 4 hours. The refractive index of the original monomer was 1.4191 and the refractive index increased during the polymerization 0.0282 giving a pelargonate polymer having a refractive index of 1.4473. The vinyl pelargonate monomer after treatment with the hydantoin possessed acceptable polymerization activity.

Another sample of the vinyl pelargonate monomer was treated with 8 grams of calcium hypochlorite in the presence of 50 grams of water at 50 to 60° C. by stirring the calcium hypochlorite and water in the vinyl pelargonate monomer for about 3 hours. The original refractive index of the vinyl pelargonate was 1.4188 and the vinyl pelargonate increased in refractive index during the polymerization 0.0294 resulting in a vinyl pelargonate polymer having a refractive index of 1.4482 and possessed acceptable polymerization activity.

Other vinyl ester monomers can be prepared and treated in a similar manner as set forth in the above Examples as will be apparent to those skilled in the art.

I claim:

1. A method for increasing the polymerization activity of a vinyl ester monomer produced by the vapor phase reaction of acetylene and a carboxylic acid in the presence of a catalyst, which comprises contacting said vinyl ester monomer with a chlorine-containing material selected from the group consisting of a hypochlorite and a chlorinated hydantoin in the presence of water to remove impurities from said vinyl ester monomer, and separating said water and said chlorine-containing material from said vinyl ester monomer.

2. The method of claim 1 in which said chlorine-containing material is calcium hypochlorite.

3. The method of claim 1 in which said chlorine-containing material is 1,3-dichloro-5,5-dimethylhydantoin.

4. The method of claim 1 in which the vinyl ester does not contain more than 18 carbon atoms.

References Cited in the file of this patent

UNITED STATES PATENTS 2,594,560    Howard _____ Apr. 29, 1952

FOREIGN PATENTS 654,471    Great Britain _____ June 20, 1951